United States Patent

Meylor et al.

Patent Number: 5,242,600
Date of Patent: Sep. 7, 1993

[54] WASTEWATER SEPARATION SYSTEM

[76] Inventors: Donald M. Meylor, 22316 Harkwood, El Toro, Calif. 92630; Patrick J. Finn, 845 Paularino Ave., Apt. E320, Costa Mesa, Calif. 92626

[21] Appl. No.: 811,462

[22] Filed: Dec. 19, 1991

Related U.S. Application Data

[63] Continuation-in-part of Ser. No. 577,158, Sep. 4, 1990, Pat. No. 5,091,083.

[51] Int. Cl.[5] .................... C02F 1/24; B01D 17/035
[52] U.S. Cl. .................................. 210/703; 210/713; 210/738; 210/221.1; 210/197; 209/169
[58] Field of Search ............... 210/197, 221.2, 221.1, 210/703, 707, 219, 713, 738; 209/169, 170

[56] References Cited

U.S. PATENT DOCUMENTS

| | | | |
|---|---|---|---|
| 2,330,489 | 9/1943 | Juell | 209/170 |
| 2,695,710 | 11/1954 | Gibbs | 210/221.2 |
| 3,122,680 | 2/1964 | Ciahottari | 210/221.2 |
| 3,175,687 | 3/1965 | Jones | 210/120 |
| 3,286,844 | 11/1966 | Juell | 209/170 |
| 3,477,581 | 11/1969 | Stearns | 210/221.2 |
| 3,794,171 | 2/1974 | Kimura | 209/170 |
| 4,146,472 | 3/1979 | Treyssac | 210/221.2 |
| 4,492,636 | 1/1985 | Burke | 210/705 |
| 4,564,457 | 1/1986 | Cairo | 210/221.2 |
| 4,579,655 | 4/1986 | Lovboutin | 210/197 |
| 4,722,784 | 2/1988 | Barnsheidt | 210/221.2 |
| 4,986,903 | 1/1991 | Canzoneri | 210/221.2 |
| 5,091,083 | 2/1992 | Meylor et al. | 210/197 |

FOREIGN PATENT DOCUMENTS 846227 7/1970 Canada .
1263356 12/1986 U.S.S.R. .
1518016 10/1989 U.S.S.R. .

Primary Examiner—Thomas M. Lithgow
Attorney, Agent, or Firm—Arthur Freilich; Robert D. Hornbaker; Leon D. Rosen

[57] ABSTRACT

A wastewater flotation separation system is provided, which operates effectively with a minimum of maintenance. The apparatus includes a container (12) for holding wastewater, an inlet (14) located at a lower portion of the container, and an aerator (24) adjacent to the inlet for generating air bubbles that cling to waste particles to bring them to the water surface. A skimming apparatus (30) which skims particles off the surface of the wastewater into a sludge receiver (44) includes a beach device (42) with an inclined upper surface (40), and a belt device (34) that moves a series of scrapers (32) along the surface of the water and along the beach device into the sludge discharge. Each scraper includes a flap of resilient material which is bent as it scrapes along the inclined beach surface. The aerator includes an aerator chamber (16) substantially sealed from the rest of the container except at its top, with the wastewater inlet opening to the chamber so bubbles are applied along the upwardly-flowing stream of waste water that flows up along the box into the rest of the container. The aerator includes a rotor (80) with hollow blades coupled to an air tube, with the tips (104) of the blades having holes opening in a substantially circumferential direction to better distribute the air bubbles. Recirculation pipes (110, 112, 114) extend from locations at the bottom of the container to the bottom of the aerator chamber.

3 Claims, 2 Drawing Sheets

WASTEWATER SEPARATION SYSTEM

This application is a continuation-in-part of Ser. No. 577,158 filed Sep. 4, 1990 which matured to U.S. Pat. No. 5,091,083.

BACKGROUND OF THE INVENTION

Wastewater can be initially treated by applying bubbles to it that attach to particles in the wastewater and carry them to the surface. The particles are then skimmed off the surface into a sludge outlet, while the rest of the now-cleaner water is further processed. There are several areas of waste water flotation separation systems where improvement would be highly desirable. One area is in skimming off the floating particles with apparatus that is simple and yet which scrapes out a very high proportion of the particles. Another area requiring improvement is in the aerator, where it is desirable to assure that the greatest proportion of created bubbles attach to particles in the wastewater, rather than merely bubbling into the atmosphere above the wastewater. Still another area where improvement is desirable, is in minimizing accumulation of sludge at the bottom of the wastewater container, so that manual cleanup of the sludge is required only at long intervals or not at all. A wastewater flotation separation system which improved one or more of the above areas which need improvement, would be of considerable value.

SUMMARY OF THE INVENTION

In accordance with one embodiment of the present invention, a wastewater flotation separation system is provided which cleans water in a simple and highly effective manner. The system includes a tank or container for holding wastewater at a predetermined level. An inlet at the lower portion of the container delivers wastewater to it, while an aerator is located adjacent to the inlet for generating bubbles to cling to waste particles and float them at the water's surface. A skimming apparatus skims off debris at the surface into a sludge discharge. The skimming apparatus includes a beach device with an inclined upper surface leading to the sludge discharge, and a belt device that moves scrapers along the water surface and along the inclined beach surface into the sludge discharge. Each of the scrapers comprises a flap of elastomeric material which efficiently moves sludge along the inclined beach surface.

The aerator includes a chamber substantially sealed from the rest of the tank except at its top. The wastewater inlet opens into the chamber, so wastewater is initially confined to upward movement along the chamber, along which air bubbles move, to increase the likelihood that any given bubble will encounter a waste particle and attach to it.

The aerator includes a rotor, rotatable about a vertical axis and having hollow blades with openings open to the wastewater, and includes an air-carrying tube coupled to the hollow blades to supply air thereto. The tips of the blades have openings directed in a substantially circumferential direction opposite to the direction of movement of the blade tips. This results in good distribution of bubbles along the aerator chamber, to efficiently merge with the waste particles.

At least one recirculation pipe lies at the bottom of the container, with a first end open to the container at a location spaced from the aerator chamber, and with a second end open to the bottom of the aerator chamber. The upward flow of water along the aerator chamber, creates a small but steady flow of water into the chamber from the second ends of the recirculation pipes. Water flowing into the recirculation pipes includes a high proportion of particles that are in the process of settling to the bottom of the container. This not only avoids the need to clean sludge from the bottom of the container at short intervals, but also results in recirculating a high proportion of particles that were not floated to the surface, back to the aerator where there is a high probability that they will be floated.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
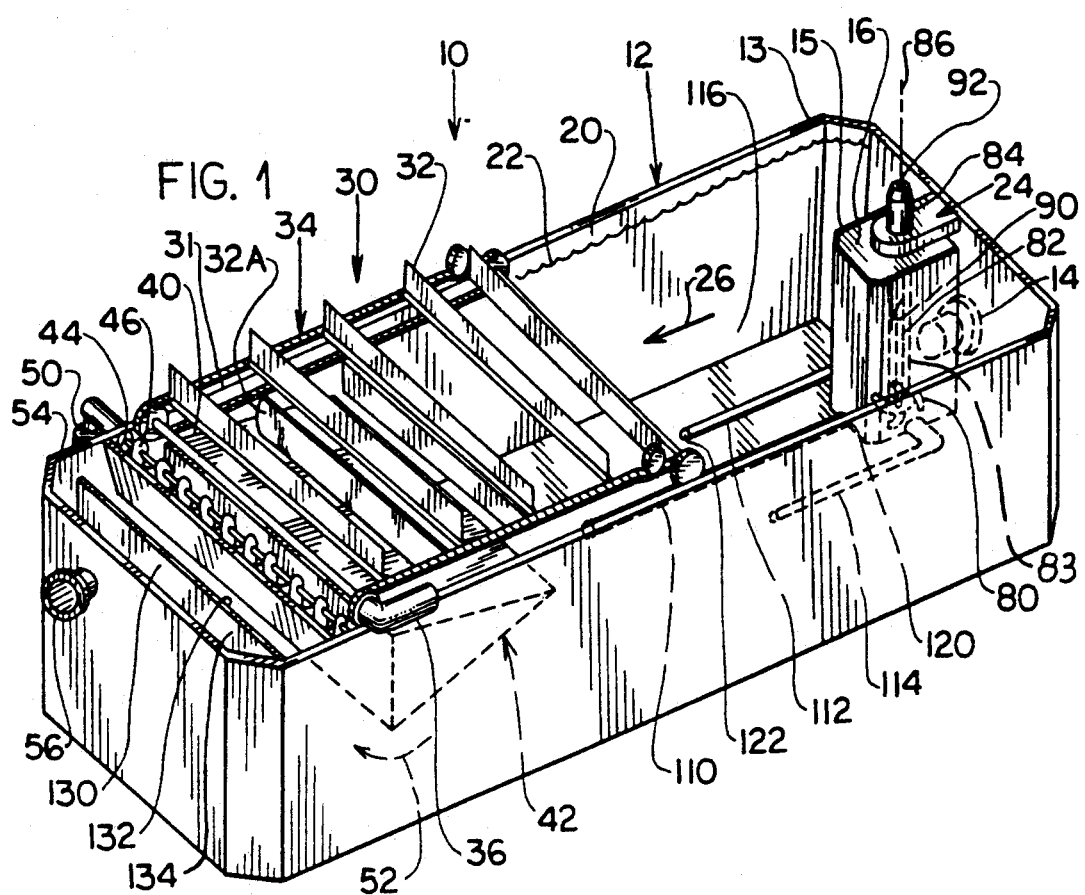
FIG. 1 is a perspective view of a wastewater flotation separation system constructed in accordance with the present invention.

FIG. 1 illustrates a wastewater flotation separation system (10) which includes a tank or container (12) having a first end portion (13) with a wastewater inlet (14) for receiving wastewater containing a high proportion of waste particles. Such waster water is generated in a wide variety of industries, such as the food industry where fat, grease, vegetable matter and other suspended solids are present. The wastewater fed to the present flotation system generally has passed only through a coarse screen to remove large particles.

Wastewater entering the inlet (14) moves up along chamber walls (15) forming an aerator box or chamber (16) into the main portion (20) of the container which holds wastewater at a level (22). In moving up the aerator conduit or chamber (16), wastewater engages tiny air bubbles generated by an aerator (24). The bubbles cling to numerous of the particles to float the particles at the surface of the water in the container. The wastewater in the main container portion (20) passes in the direction (26) to a skimming apparatus (30) at a second end portion (31) of the container. The skimming apparatus includes several scrapers (32) mounted on a belt device (34) extending in an endless loop and driven by a motor (36). Those scrapers at the lower half of the belt device, such as scraper (32A), dip into the water to move particles at the surface of the water along an inclined beach surface (40) of a beach device (42), into a sludge receiver (44). A screw auger (46) in the sludge receiver moves the sludge to a sludge discharge (50). Water in the container moves under the beach device along the path (52) to a cleaned water section (54), and into a cleaned water outlet (56).

Figure 5:
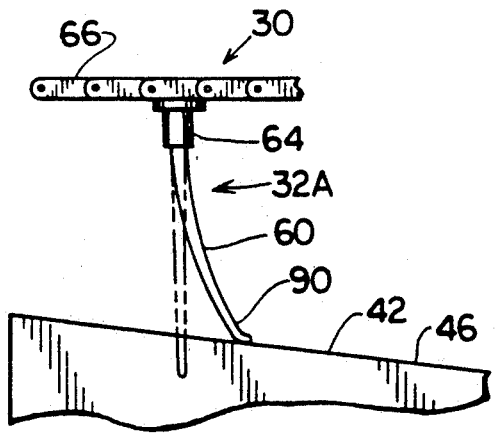
FIG. 5 is a side view of a scraper of the system of FIG. 2, shown as it moves along the inclined upper surface of the beach device.

As shown in FIG. 5, each scraper such as (32A) includes a flap (60) of elastomeric material, with an upper or mount end (62) held by a mount (64) on a chain (66)

of the chain device. The flap has a lower or scrape end (70) which can ride up along the upper surface (46) of the beach device (42). As the flap (60) rides further along the beach surface (46), the flap is bent progressively more so it can push with greater force against particles and avoid having the flap merely ride over particles trapped on the beach surface.

Figure 6:
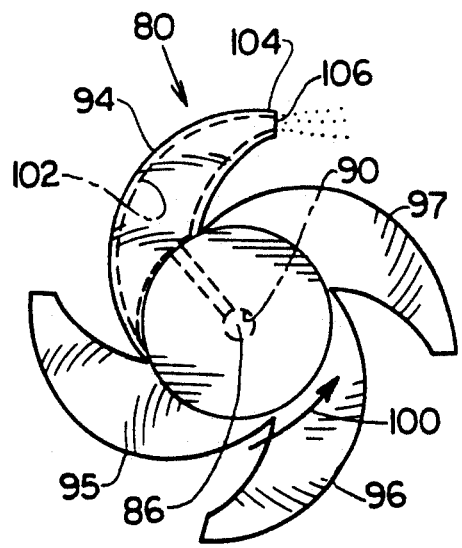
FIG. 6 is a bottom view of the propeller or rotor of the aerator of FIG. 2.
Figure 2:
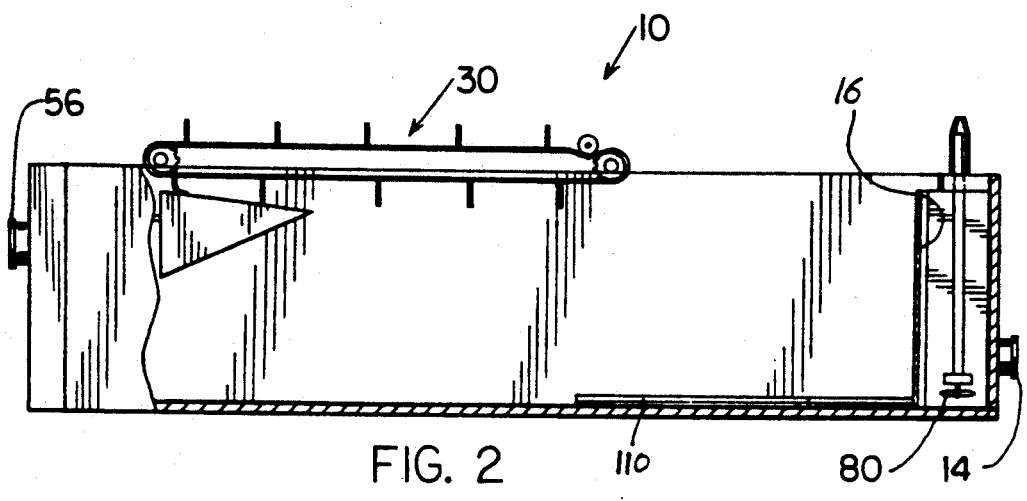
FIG. 2 is a sectional side view of the system of FIG. 1.

The aerator (24) (FIG. 1) includes a propeller or rotor (80) at the bottom of a shaft (82) that is rotatably mounted on a frame (83), and that is driven by a motor (84) to rotate about a vertical axis (86). The shaft is hollow to form an air passage or tube (90) with an upper end (92) open to the atmosphere to allow air to enter the tube and pass down to the rotor (80). As shown in FIG. 6, the rotor has several blades (94-97) that rotate in the direction 100. Each blade is hollow, with a conduit (102) coupled to the tube or passage (90). The tip (104) of each blade has an opening (106) coupled to the air-carrying conduit (102). As the blades rotate about the axis (86), cavitation is produced, especially at the tips (104) of the blades. The cavitation produces a vacuum that draws air out of the opening (106), and which breaks the emerging air into multiple small bubbles. The bubbles rise along the aerator chamber (16) and many attach themselves to particles to float them.

In order to attach the greatest percentage of bubbles to particles, the bubbles and particles should be moving roughly in the same direction and at the same speed. The fact that the wastewater inlet (14) (FIG. 1) is in the same area as the aerator (24), and both the incoming wastewater (where particle density is greatest) and bubbles move along parallel paths, results in high efficiency of bubble to particle engagement. The fact that the source of bubbles at the rotor (80) and the incoming wastewater are confined to movement within the chamber (16), results in their being confined to movement along the same path.

It is desirable that the bubbles generated at the rotor (80) be distributed substantially uniformly along the cross section of the aerator box (16). Applicant finds that placing the openings (106) so they face circumferential to the axis (86) of rotation and opposite to it, results in producing bubbles with minimum initial velocity. As a result, the bubbles do not tend to be initially driven to the walls of the aerator chamber (16), but instead tend to be uniformly distributed across the cross section of the box. In addition, the openings (106) that are directed opposite to the velocity of the tips (104) results in the greatest vacuum to draw air out of the openings. As a result, considerable air flow is produced without requiring a pump to pump air into the open upper end of the shaft.

The separator system of FIG. 1 includes three recirculation pipes (110, 112, 114) which are useful to remove sludge from the bottom or lower portion (116) of the container. Each pipe, such as 110, has a first or rear end (120) open to the bottom of the aerator chamber (16), below the wastewater inlet (14). Each pipe also has a second or forward end (122) which is open to a region of the container that is spaced from the aerator chamber. As the wastewater moves up the aerator chamber (16) to overflow into the rest of the container (12), it produces a vacuum at the first end (120) of the pipe. As a result, wastewater near the bottom of the container (12) flows into the second end (122) of the recirculation pipe to flow into the bottom of the aerator chamber (16), to flow up through the aerator chamber and back into the rest of the container (12). Those particles that are heavier than water and which are not entrained in an air bubble, tend to sink to the bottom of the container. Without a recirculating pipe, the bottom of the tank would have to be scraped free of sludge at frequent intervals. By recirculating wastewater near the bottom of the tank, applicant removes a large proportion or even most of the particles that would otherwise settle on the bottom of the tank. Furthermore, this removal of particles that would otherwise settle, is accomplished without an additional electric pump, but is accomplished by the vacuum created by wastewater and bubbles flowing upwardly along the aerator chamber (16).

Figure 3:
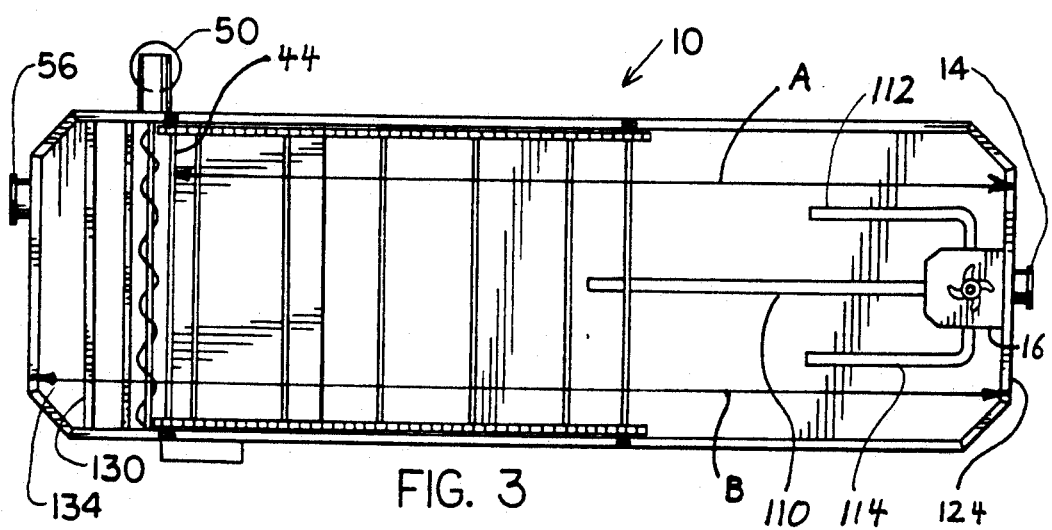
FIG. 3 is a plan view of the system of FIG. 1
Figure 4:
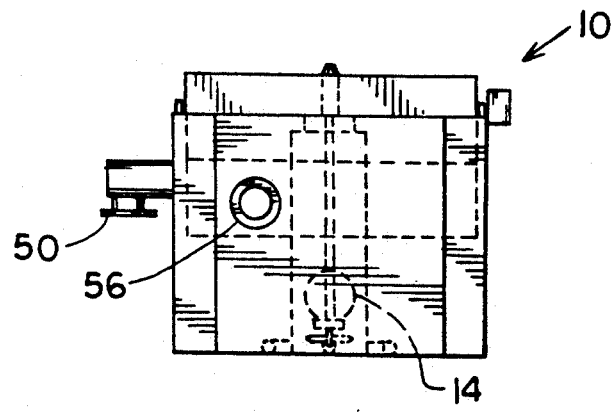
FIG. 4 is a rear elevation view of the system of FIG. 1.

In a system that applicant has constructed and successfully tested for a flow rate of 220 gallons per minute, the tank had a flotation length A (FIG. 3) from the rear end (124) to the sludge receiver (44), of fourteen feet. The tank had a width of six feet and a depth of six feet. Each of the recirculation pipes (110, 112, 114) had an inside diameter of about three inches. Each of the outer pipes (112, 114) had a length of about one-quarter the tank flotation length A. The middle pipe 110 had a length of about one-half the flotation length A, and about one-third the overall tank length B of 18.5 feet to the cleaned water outlet 56.

It is desirable that each recirculation pipe have a length that is a plurality of times, and preferably at least ten times its width. It is also desirable that the front end of at least one recirculation pipe lie a distance from the aerator chamber 16 which is at least one-tenth the length B of the tank. The recirculation pipes lie in or near the bottom of the tank (closer to the bottom than to the wastewater level). The rear ends of the pipes connect to lower locations of the aerator chamber 16 (closer to the bottom than the top) and preferably below the wastewater inlet 14.

In order for the wastewater flotation separation system to operate efficiently, the level (22) of water in the container (12) must be maintained at a predetermined constant level. This is accomplished by a weir (130) whose upper end is at the desired level (22) of water in the container (12). Water flows to an inlet side (132) of the weir and over the weir to an outlet side (134) of large cross-sectional as seen in a plan view, that leads to the cleaned water outlet (56) of smaller cross-section along flow therein.

Thus, the invention provides a flotation separation system which is relatively simple, with a minimum number of moving parts and which has low maintenance requirements. The system includes a skimming apparatus for removing particles floating at the surface of water in a container, which includes scrapers mounted on an endless belt device, wherein each scraper comprises a flap of resilient material, with the lower flap ends being progressively more deflected by an inclined beach surface as the scrapers move along it. Wastewater particles are floated by an aerator that includes an aerator chamber which is substantially sealed from the rest of the container except at the top of the chamber, and with the wastewater inlet and the air bubble source both located in the lower part of the chamber. This arrangement causes bubbles and wastewater particles to move in substantially the same direction and velocity for most effective engagement of air bubbles with particles. The aerator includes a motor drive rotor with hollow blades coupled to an air source such as the atmosphere and having outlets through which air passes into the water. The bubble outlets lie at the tips of the blades and extend in a substantially circumferential direction with respect to the axis of rotor rotation, with the openings directed opposite to the movement of the rotor tips. Recirculation pipes are provided at the bottom of the container, with each having one end open to a location near the bottom of the container spaced from the box, and another end open to the bottom of the aerator chamber, below the wastewater inlet. The upward flow of wastewater and bubbles in the aerator chamber drags in water through the recirculation pipes to recirculate particles that would otherwise settle on the bottom of the container.

Although particular embodiments of the invention have been described and illustrated herein, it is recognized that modifications and variations may readily occur to those skilled in the art, and consequently, it is intended that the claims be interpreted to cover such modifications and equivalents.

We claim:

1. In a method for removing particles from wastewater, which includes flowing wastewater into a chamber having an open upper portion coupled to a container applying air bubbles to said wastewater in said chamber thereby moving said wastewater and bubbles upwardly out of the open upper portion of said chamber and into said container, said bubbles attaching to the particles in the wastewater and floating to an upper water surface in said container, removing particles from the water surface, and flowing out of said container water from which a large proportion of the particles have been removed, the improvement including:

flowing wastewater from a location spaced from said chamber and near the bottom of said container, through a pipe back into a lower portion of said chamber;

said step of applying air bubbles includes rotating a rotor while emitting air from tips of the rotor in a substantially circumferential direction opposite to rotor tip movement.

2. In a method for removing particles from wastewater, which includes flowing wastewater into a chamber to flow upwardly therein and into a tank, applying air bubbles to move upwardly along said chamber and into said tank with said wastewater float particles of the wastewater to the water surface in said tank, removing particles from the water surface, and flowing out of said tank water from which a large proportion of the particles have been removed, the tank being elongated and defining a length, the improvement including:

establishing at least one primarily horizontal elongated pipe within tank at the bottom of said tank, with a first end of said pipe opening to a location in the lower portion of said tank with said location being at least one-tenth the length of said tank away from said chamber and an opposite second end of said pipe opening into said chamber, and flowing water and particles which have sunk to the location of said pipe first end, along the bottom of said tank within said pipe, back to said chamber substantially by suction produced in said chamber by the upward flow of said wastewater and air bubbles in said chamber.

3. The method described in claim 2 wherein:

said step of establishing includes establishing a plurality of primarily horizontal elongated pipes at the bottom of said tank with each having first and second ends, with said first ends of said pipes being horizontally spaced from each other within said tank, and with said second ends all opening into said chamber, and including flowing water and particles along the bottom of said tank within all of said pipes back to said chamber.

* * * * *